United States Patent
Feldman

(10) Patent No.: US 10,795,597 B2
(45) Date of Patent: *Oct. 6, 2020

(54) THINLY PROVISIONED DISK DRIVES WITH ZONE PROVISIONING AND COMPRESSION IN RELATION TO ZONE GRANULARITY

(71) Applicant: SEAGATE TECHNOLOGY LLC, Cupertino, CA (US)

(72) Inventor: Timothy R. Feldman, Louisville, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/128,203

(22) Filed: Sep. 11, 2018

(65) Prior Publication Data
US 2019/0012106 A1    Jan. 10, 2019

Related U.S. Application Data

(63) Continuation of application No. 14/805,090, filed on Jul. 21, 2015, now Pat. No. 10,073,647.

(51) Int. Cl.
*G06F 3/06* (2006.01)
*G06F 12/02* (2006.01)

(52) U.S. Cl.
CPC ............ *G06F 3/0644* (2013.01); *G06F 3/064* (2013.01); *G06F 3/0608* (2013.01); *G06F 3/0661* (2013.01); *G06F 3/0676* (2013.01); *G06F 3/0665* (2013.01); *G06F 12/023* (2013.01); *G06F 2212/401* (2013.01); *G06F 2212/7201* (2013.01)

(58) Field of Classification Search
CPC ...... G06F 3/0644; G06F 3/064; G06F 3/0676; G06F 3/0661; G06F 3/0608; G06F 3/0665; G06F 12/023; G06F 2212/7201; G06F 2212/401
USPC ............. 711/111, 203, 4, 170; 707/693, 823; 710/68
See application file for complete search history.

(56) References Cited

U.S. PATENT DOCUMENTS

| | | |
|---|---|---|
| 8,156,306 B1 | 4/2012 | Raizen et al. |
| 8,818,966 B1 | 8/2014 | Nanda |
| 8,819,291 B2 | 8/2014 | Benhase et al. |
| 8,862,560 B1 * | 10/2014 | Wu ........................ G06F 16/217 707/693 |
| 8,898,384 B2 | 11/2014 | Kawaguchi |
| 9,411,517 B2 | 8/2016 | Vaghani et al. |

(Continued)

OTHER PUBLICATIONS

Naik, D., Virtual Machine Storage—often overlooked optimizations, Niriva LLC, Storage Developer Conference, Santa Clara, 2010.

*Primary Examiner* — Hong C Kim
(74) *Attorney, Agent, or Firm* — Hall Estill Attorneys at Law

(57) ABSTRACT

Methods, systems, and apparatuses are described for provisioning storage devices. An example method includes specifying a logical zone granularity for logical space associated with a disk drive. The method further includes provisioning a zone of a physical space of the disk drive based at least in part on the specified logical zone granularity. The method also includes storing compressed data in the zone in accordance with the provisioning.

20 Claims, 5 Drawing Sheets

(56) References Cited

U.S. PATENT DOCUMENTS

| | | | |
|---|---|---|---|
| 10,073,647 B2 * | 9/2018 | Feldman | G06F 3/0676 |
| 2010/0306500 A1 * | 12/2010 | Mimatsu | G06F 3/0605 |
| | | | 711/209 |
| 2011/0208931 A1 | 8/2011 | Pendharkar et al. | |
| 2011/0307659 A1 | 12/2011 | Hans et al. | |
| 2012/0303928 A1 | 11/2012 | Hall | |
| 2012/0303930 A1 | 11/2012 | Coker et al. | |
| 2013/0006948 A1 * | 1/2013 | Shmueli | G06F 16/185 |
| | | | 707/693 |
| 2013/0117527 A1 | 5/2013 | Shu | |
| 2013/0238834 A1 | 9/2013 | Feldman et al. | |
| 2014/0143517 A1 | 5/2014 | Jin et al. | |
| 2014/0365785 A1 | 12/2014 | Deforest et al. | |
| 2015/0095555 A1 | 4/2015 | Asnaashari et al. | |
| 2015/0193342 A1 | 7/2015 | Ohara et al. | |
| 2016/0070652 A1 | 3/2016 | Sundararaman et al. | |
| 2016/0139815 A1 * | 5/2016 | Levy | G06F 3/0605 |
| | | | 711/158 |
| 2016/0147759 A1 * | 5/2016 | Bolik | G06F 16/21 |
| | | | 707/723 |
| 2017/0024160 A1 | 1/2017 | Feldman | |

\* cited by examiner

THINLY PROVISIONED DISK DRIVES WITH ZONE PROVISIONING AND COMPRESSION IN RELATION TO ZONE GRANULARITY

RELATED APPLICATION

This application is a continuation of U.S. patent application Ser. No. 14/805,090, filed on 21 Jul. 2015, and entitled THINLY PROVISIONED DISK DRIVES WITH ZONE PROVISIONING AND COMPRESSION IN RELATION TO ZONE GRANULARITY, pending, the disclosure of which is incorporated in its entirety by this reference.

SUMMARY

The described features generally relate to one or more improved systems, methods, and/or apparatuses for storing data on a storage device, such as a disk drive. Certain aspects of the present description employ various approaches for provisioning one or more storage devices. For example, a disk drive having zone-level provisioning and physical space provisioning may be thinly provisioned based on a compressed zone size. In one example method, a logical zone granularity for logical space associated with a disk drive is specified. A zone of a physical space of the disk drive is provisioned based at least in part on the specified logical zone granularity. Compressed data may be stored in the zone in accordance with the provisioning. In another example, when reusing physical space of the disk drive, techniques described herein treat the physical space for each zone as a shingled magnetic recording (SMR) band. Isolation space for the SMR bands may be dynamically assigned.

In some aspects, the described techniques improve an amount of data storage for a given amount of physical space of the storage devices. Further, logical address spaces are provided that are larger than the amount of data that would typically be stored in as an address so that a sparse set of logical addresses may be used instead of using a dense, fully provisioned space for the address. The devices and systems described herein may also support sequential write capability, low read rates, and command response times that may be less than tens or hundreds of milliseconds.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
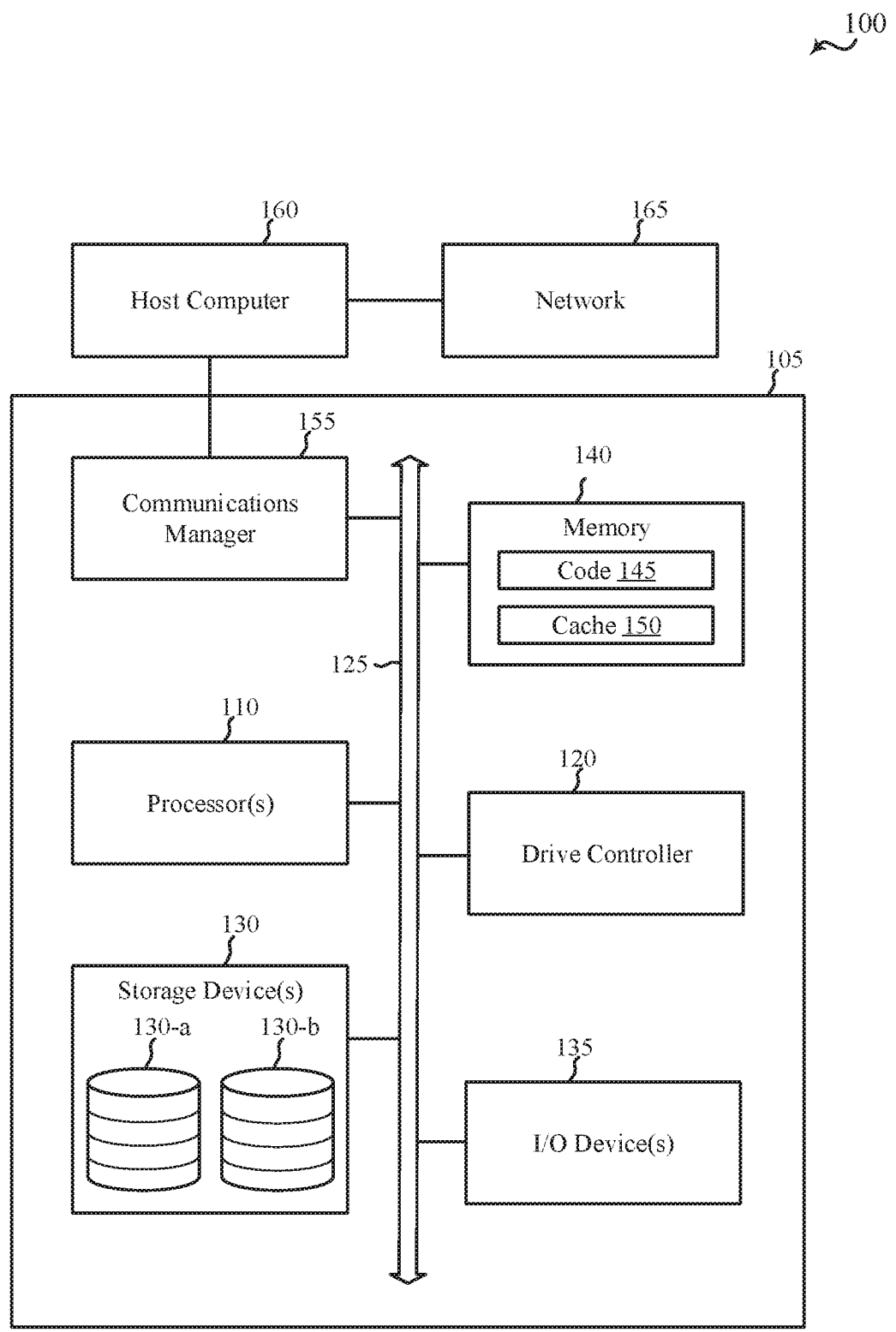
FIG. 1 shows a block diagram of an example data storage system, in accordance with various aspects of the present disclosure.

The present disclosure relates to provisioning storage mediums having zone-level provisioning. The storage mediums may be provisioned based on thin provisioning. Provisioning is a storage management process by which one or more storage mediums are broken into logical unit numbers (LUNs). Each LUN may be assigned to a particular application that uses the storage medium. In traditional provisioning, a LUN corresponds to an actual empty portion of physical space of the storage medium. As the provisioned space fills, performance may be degraded for the assigned application. To counter this and other detriments, thin provisioning may be used. Thin provisioning is a virtualization mechanism in which more virtual resources (e.g., logical zones) are created than the physical resources (e.g., physical zones of the storage medium or device) can actually support. Thus, thin provisioning uses oversubscription to create a LUN from a common pool of storage. The LUN may be larger than the amount of physical space available in the storage medium. Thin provisioning may be dynamically used to create and resize the storage medium (e.g., if a volume is added to the storage medium). Thin provisioning may provide a more efficient schema for allocating space to servers and applications, for example, than a one-to-one provisioning (e.g., thick provisioning). As used herein, to thinly provision a storage medium is to apply a thin provisioning mechanism to the storage medium.

Techniques and systems described herein perform thin provisioning based on a specific granularity of logical space provisioning. Previously, thin provisioning used a variety of granularity of logical space. Thus, the physical space provisioning for a provisioned logical space had to support a potentially arbitrary set of zone sizes. However, using a specific granularity of logical space provisioning may enable systems and devices to only need to support that specific size.

An SMR drive may use statistically allocated space for each physical band. According to techniques described herein, SMR provisioning may dynamically place the band boundaries (e.g., boundaries for each physical band). Logical zones may be statically or dynamically mapped to the bands.

Further, compression may be used on the storage medium when writing data.

In some aspects, the described techniques provide an improved solution for provisioning a storage medium and storing user data on that storage medium. For example, the storage medium may be provisioned according to a specific granularity, the storage medium may be treated as an SMR drive, and compressed user data may be written to the storage medium.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of an example data storage system 100, in accordance with various aspects of the present disclosure. The data storage system 100 may thinly provision the one or more storage devices using zone provisioning and data compression. The data storage system 100 may include a data storage device 105, which may be coupled to a host computer 160 and/or a network 165.

FIG. 1 shows an example where the data storage device 105 is coupled directly to the host computer 160, which is in turn coupled to the network 165. In other examples, the data storage device 105 may be directly coupled with the network 165. In further examples, the data storage device 105 may be coupled to one or more host computers 160 and the network 165. The network 165 may provide user authentication, access authorization, tracking, Internet Protocol (IP) connectivity, and other access, routing, or mobility functions. The network 165 may be a wired or wireless network.

The data storage device 105 may include a processor 110, a drive controller 120, a storage device 130, and a memory 140. The data storage system 100 may also include one or more input/output (I/O) devices 135, and a communications manager 155. Each of these modules may be in communication with each other, directly or indirectly, over one or more buses 125. The I/O devices 135 may include, for example, a keyboard, monitor, storage device, modem, pointing device, or user interface device.

The memory 140 may include random access memory (RAM) and/or read-only memory (ROM). The memory 140 may store computer-readable, computer-executable software/firmware code 145 containing instructions that are configured to, when executed, cause the processor 110 to perform various functions described herein related to data storage (e.g., to perform drive provisioning, write compressed data to the provisioned drive, etc.). Alternatively, the computer-readable, computer-executable software/firmware code 145 may not be directly executable by the processor 110 but be configured to cause the data storage system 100 (e.g., when compiled and executed) to perform various of the functions described herein. The memory 140 may further include a cache 150 that allows for sequential writing of data to the storage device 130 and for managing a free pool of unused zones of the storage device 130. The cache 150 may also include indexing for each logical zone and physical space for read access.

The processor 110 may include an intelligent hardware device, e.g., a central processing unit (CPU), a microcontroller, an application specific integrated circuit (ASIC), etc. The processor 110 may process information received through the communications manager 155, from the host computer 160 or the network 165. The information may include, for example, read commands, write commands, and user data for storage. The processor 110 may handle, alone or in connection with the drive controller 120, various aspects of discovery procedures for the data storage system 100.

The drive controller 120 may be configured to perform and/or control some or all of the features and/or functions related to data storage for the data storage system 100. The drive controller 120 may specify a logical zone granularity for logical space associated with the one or more storage devices 130, provision a zone of a physical space of the one or more storage devices 130 based at least in part on the specified logical zone granularity, and store compressed data in the zone in accordance with the provisioning. The drive controller 120, or portions thereof, may include a processor, and/or some or all of the functions of the drive controller 120 may be performed by the processor 110 and/or in connection with the processor 110. The drive controller 120 may interface with the storage device 130 as a zoned block device interface with thin provisioning. The drive controller 120 may include one or more integrated circuits.

The storage device 130 may include one or more volumes (e.g., disk drives) of memories of various types and sizes. For example, the storage device 130 may be one or more of a magnetic disk, optical disk, or solid-state flash memory device. As shown in FIG. 1, the storage device 130 includes storage devices 130-a and 130-b. The storage devices 130-a, 130-b are provisioned according to techniques described herein. For example, the storage devices 130-a, 130-b have zone-level provisioning in logical space and the physical space is thinly provisioned based on a compressed zone size. One or more of the storage devices 130-a, 130-b may be an SMR drive. The storage device 130 may be organized as a set of storage areas referred to as physical zones. In some examples, the physical zones may be physical bands as in an SMR drive. Each physical zone may be allocated to addressing or user data storage. Any physical zone not allocated may be part of a free pool. Further physical zones may be created from the free pool and allocated to one or more uses, such as addressing or user data storage for a particular application. The user data storage may be organized further into logical zones. The logical zones may be a same size or a different size of the physical zones.

The processor 110 may send one or more host commands (e.g., a read command or a write command) to the drive controller 120 to store or retrieve user data from the storage device 130. The drive controller 120 may receive the commands and/or user data from the processor 110 and manage execution of the commands to retrieve or store data from the storage device 130. For example, the drive controller 120 may receive a write command and store compressed user data in the storage device 130 according to the provisioning of the storage device 130.

Figure 2:
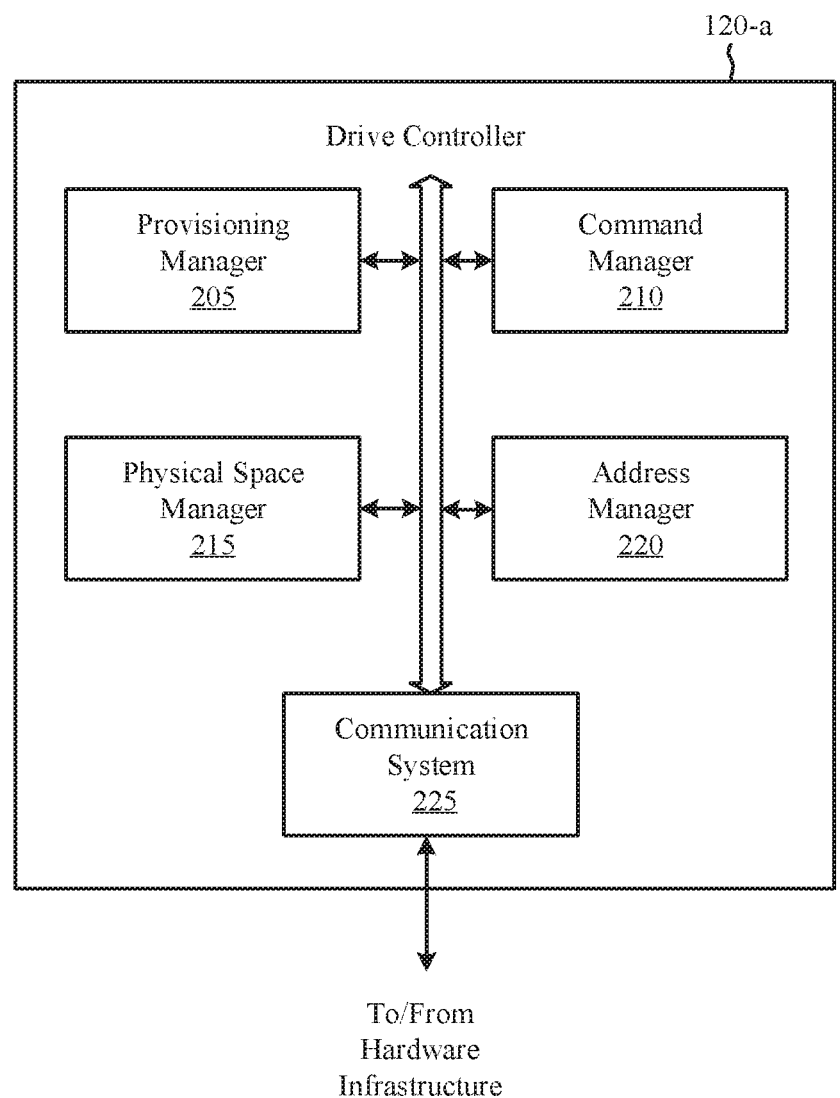
FIG. 2 shows a block diagram of an example drive controller, in accordance with various aspects of the present disclosure.

FIG. 2 shows a block diagram of an example drive controller 120-a, in accordance with various aspects of the present disclosure. In some examples, the drive controller 120-a may be an example of aspects of the drive controller 120 described with reference to FIG. 1. The drive controller 120-a may be configured to implement or facilitate at least some of the data storage features and functions described with reference to FIG. 1.

The components of the drive controller 120-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, field programmable gate arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

In some examples, the drive controller 120-a may monitor, control, or otherwise manage one or more aspects of data storage for one or more storage devices. The drive controller 120-a may include at provisioning manager 205, a command manager 210, a physical space manager 215, and an address manager 220. The drive controller 120-a may also include a communication system 225 that may be used to receive various types of data and/or command signals (e.g., read and write commands) over a wired or wireless connection to one or more devices such as a data storage system, a host computer, or a network, such as shown in the data storage system 100 described with reference to FIG. 1.

The provisioning manager 205 may provision one or more storage devices, such as the storage devices 130-a, 130-b described with reference to FIG. 1. The provisioning manager 205 may create logical zones that are associated with physical zones of the storage device 130. The provisioning manager 205 may specify a logical zone granularity for the logical space associated with the storage device 130.

The provisioning manager 205 may provision a zone of a physical space of the disk drive based at least in part on the specified logical zone granularity. The provisioning manager 205 may initially provision an entire storage device, or may provision one or more zones of the storage device after an initial provisioning (for example, as the need for additional zones arises). The provisioning manager 205 may provision the storage device such that it has more logical space than physical space. Having more logical space than physical space may allow for data compression for user data stored in the physical space. For example, having a hundred times more logical space than physical space may allow for a 100:1 compression ratio for writing data to the storage device. In other examples, the logical space may be zoned into other multiples of the physical space. Further, other compression ratios may be used. As another example, for logical zones of 512 bytes, the logical space may be a 48-bit addressing of 128 pebibyte (PiB).

In some examples, the provisioning manager 205 may provision the zone from a free pool of unused space of the storage device. The provisioning manager 205 may place the zone approximately halfway within a largest available free space on the storage device. The provisioning manager 205 may also provision the zone based on a maximum amount of space that would be required to write data to the disk drive when the data is uncompressed. In further examples, the provisioning manager 205 may allocate band isolation for the physical space of the storage device, which may or may not be an SMR drive.

The command manager 210 may manage host commands for the storage device. The host commands may include, for example, read commands and write commands. Responsive to a write command, the command manager 210 may write user data to the storage device in a compressed manner. When a zone is filled, a known amount of physical space is used. The command manager 210 may report the amount of physical space and indexing of the zone for future read access. The drive controller 120-a may record the amount of physical space and the index values. The physical space manager 215 may return any unused space in the allocated zone to the free pool for future provisioning.

The command manager 210 may select a compression level for compressing the user data. The compression level may be based on a read access time of the storage device. That is, the filling process may use compression with an appropriate method for the read access times. For example, a read may need to be successful within two revolutions of disk access. The first revolution may be to lookup the offset within the band. The second revolution may be for reading the entire track (e.g., zone) in order for the data to be decompressed. Once the compression level is determined, the command manager 210 may write a data set to one or more zones of the physical space according to the compression level and in accordance with the provisioning of the storage device.

In some situations, the command manager 210 may not be able to compress user data when writing to the storage device. For example, the user data may not be compressible. To compensate for this potentiality, the command manager 210 may determine a maximum amount of space that would be required to write data to the storage device when the data is uncompressed. The command manager 210 may provide an indication of the amount of space to the provisioning manager 205. The provisioning manager 205 may provision one or more zones based on the maximum amount of space.

The physical space manager 215 may manage free space in the physical space. The physical space manager 215 may include any unused space into a free pool. When a compressed zone is decommissioned through a trim operation, an unmap operation, or a reset write pointer operation, the unused space may be smaller than a size needed for a subsequent zone provisioning. If zones that were provisioned from consecutive physical spaces are decommissioned, the physical space manager 215 may aggregate them into the free pool. The aggregate space may provide a large enough extent for a new provisioned zone. In some instances an uncompressed zone may not be sufficiently large for a subsequent zone provisioning that requires isolation space (e.g., for an SMR drive). The physical space manager 215 may perform a defragmenting process on the storage device to move full zones such that smaller free extents may be aggregated into larger free extents.

The address manager 220 may allocate a logical address space according to a maximum addressing size available for a given block size of the zone. The address manager 220 may provide addresses to the command manager 210 for accessing specific user data on the storage device. The address manager 220 may also record metadata to enable performant random reads. After any metadata and compressed data is recorded for a zone, the physical space manager 215 may return any unused allocated space to the free pool.

The drive controller 120-a may operate according to different models, including, for example, an external usage model and an internal usage model. In one example following the external usage model, the provisioning manager 205 may provision a small set of zones. When written to, these zones may be concurrently filled with sequential writes. The filling zones may be in an open or closed state. The number of filling zones may be equal to the number of disk surfaces (e.g., physical space of the storage device). The command manager 210 may support a sequential write to a filling zone at any given moment unless otherwise limited by a maximum number of open zones. However, activating or opening another zone may fail if the provisioning manager 205 cannot provision any more physical space from the storage device. To free up physical space, zones may be emptied. After a zone is emptied, the physical space manager 215 may manage the emptied zone such that the provisioning manager 205 may open a new zone as the released physical space immediately makes sufficient space for a newly provisioned zone or aggregates with other released physical space to eventually make sufficient space.

In another example following the internal usage model, the provisioning manager 205 provisions an amount of physical space for user data based on a maximum size of the user data if it were uncompressible. The physical space for the zone may also include any required isolation space, such as for SMR drives. SMR drives may need isolation space following full zones but may not need isolation space following filling zones (e.g., zones that contain data but are not yet full) and any preceding allocated zone whether open, closed, or full. This may be possible because the space for full zones will go through the provisioning step and the just-allocated space may act as a following zone that requires preceding isolation space. Thus, allocation may preferably follow a full zone without any allocation of isolation space preceding the new allocation. The command manager 210 may fill zones according to compression and record the space used and index. The physical space manager 215 may process any unused or decommissioned space into the free pool for new provisioning.

In an example with one filling zone per surface of the storage device, the provisioning manager 205 may provision a first set of zones, one per surface. When a zone is filled, the command manager 210 knows the size of the zone. The provisioning manager 205 may provision a second set of zones immediately following the zone that the command manager 210 filled without any isolation space. The provisioning manager 205 may proceed through a complete initial filling of the storage device. The drive controller 120-*a* may achieve storage gains from the compression and expend no costs for isolation space. After an initial filling without any zone decommissioning, the command manager 210 (or the storage device) may report that the drive is full in response to a request to start filling another zone. The drive may stay in the full state until enough zones are decommissioned and enough defragmentation can occur such that the physical space manager 215 has created a large enough extent for an uncompressible zone and any needed isolation space. In some examples, if the decommissioning of one zone and sufficient defragmentation may be enough to provision an additional zone.

If a number of filling zones is greater than a number of surfaces, then the provisioning manager 205 may place zones approximately halfway in the largest available free extent. In this situation, any unused space after a zone fills will be continuous with a maximally sized extent in the free pool, which creates a larger free extent.

The drive controller 120-*a* therefore provides thin provisioning at a specific granularity, allocates space for zones from a free pool of space with dynamic placement of isolation space, and applies compression directly to the storage device.

Figure 3:
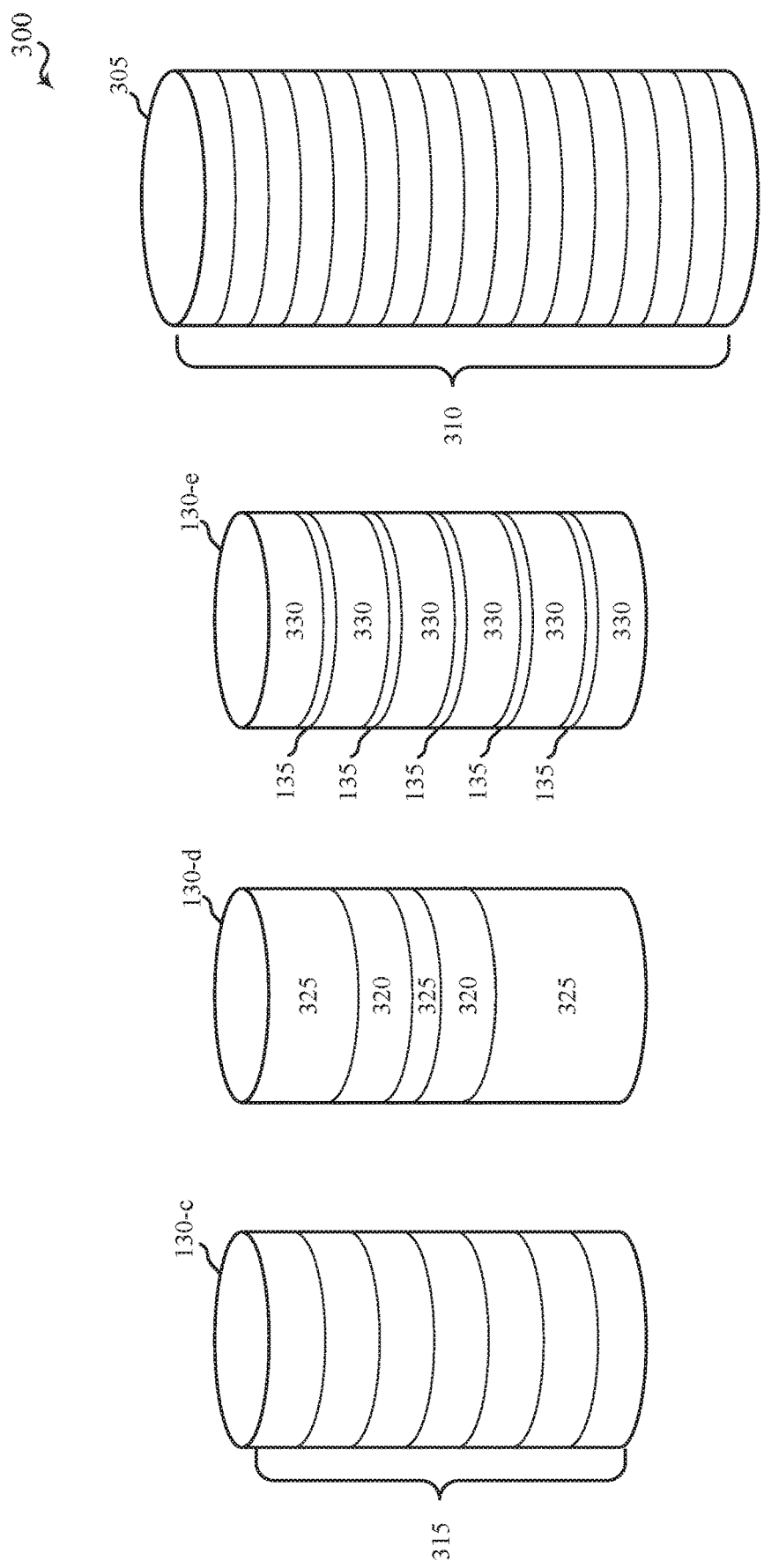
FIG. 3 shows a conceptual diagram illustrating physical space zones and logical space zones, in accordance with various aspects of the present disclosure.

FIG. 3 shows a conceptual diagram 300 illustrating physical space zones and logical space zones, in accordance with various aspects of the present disclosure. The diagram 300 includes three storage devices, 130-*c*, 130-*d*, and 130-*e*. Each storage device 130-*c*, 130-*d*, and 130-*e* may be any type of disk drive. For example, the storage devices 130-*c* and 130-*d* may be conventional disk drives, while the storage device 130-*e* is an SMR drive. The storage devices 130-*c*, 130-*d*, and 130-*e* may be an example of one or more aspects of the storage devices 130 described with reference to FIG. 1.

The diagram 300 also illustrates an associated logical space 305. The logical space 305 may provide virtual space for each of the storage devices 130-*c*, 130-*d*, and 130-*e*. A drive controller, such as the drive controller 120, may have provisioned the logical space 305 into a plurality of zones 310. The zones 310 may each have the same granularity. Each zone 310 may correspond to a zone on the physical space of one of the storage devices 130-*c*, 130-*d*, and 130-*e*.

The storage device 130-*c* may have a plurality of physical zones 315. Each physical zone 315 may be open, closed, or full. The data written to a physical zone 315 may be compressed.

Likewise, the storage device 130-*d* may have a plurality of physical zones 320. In the example of FIG. 3, the storage device 130-*d* has only two physical zones 320. The storage device 130-*d* has free extents 325 that may have been previously decommissioned zones. The free extents 325 may be provisioned into new zones or may be aggregated into a larger free extent.

The storage device 130-*e* may be an SMR drive. The storage device 130-*e* may have a plurality of physical zones 330 separated by isolation space 335. In some examples, the isolation space 335 is not included after specific physical zones 330, such as filling zones or preceding any allocated zone whether open, closed, or full.

A drive controller coupled to the storage device 130 may manage provisioning, reads, writes, defragmenting, and addressing for the storage devices 130 according to techniques described herein.

Figure 4:
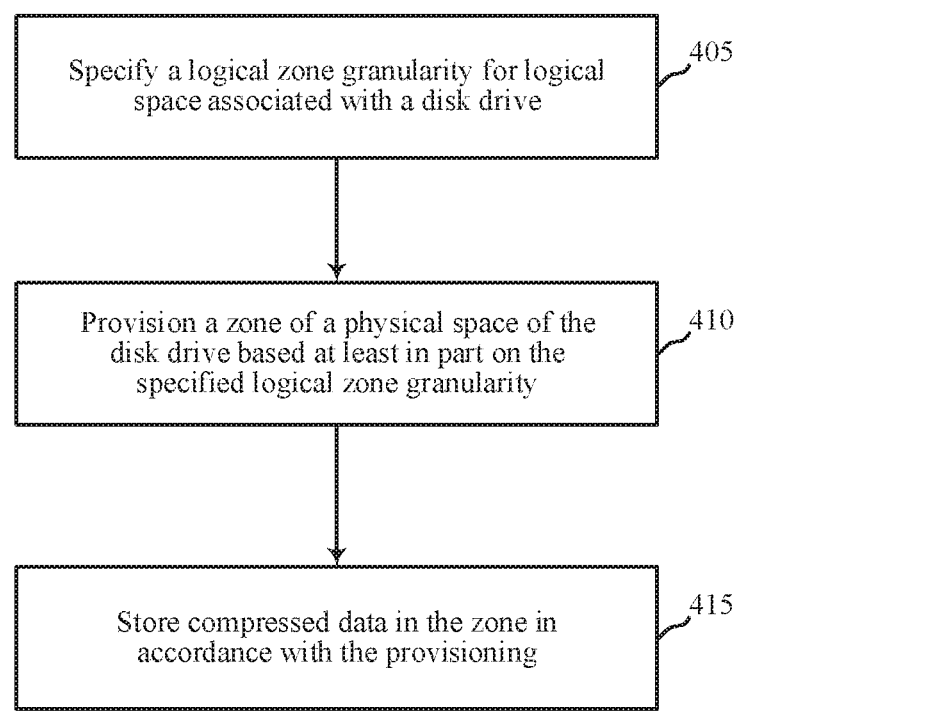
FIG. 4 is a flow chart illustrating an example method for data storage, in accordance with various aspects of the present disclosure.

FIG. 4 is a flow chart illustrating an example method 400 for data storage, in accordance with various aspects of the present disclosure. For clarity, the method 400 is described below with reference to aspects of one or more of the drive controllers 120 described with reference to FIGS. 1 and 2, and/or aspects of the system 100 described with reference to FIG. 1. In some examples, a drive controller may execute one or more sets of codes to control the functional elements of the storage device to perform the functions described below. Additionally or alternatively, the drive controller may perform one or more of the functions described below using special-purpose hardware.

At block 405, the method 400 may include specifying a logical zone granularity for logical space associated with a disk drive. The disk drive may be any storage device, such as aspects of one or more of the storage devices 130 described with reference to FIGS. 1 and 3.

At block 410, the method 400 may also include provisioning a zone of a physical space of the disk drive based at least in part on the specified logical zone granularity. In some examples, the method 400 includes determining a maximum amount of space that would be required to write data to the disk drive when the data is uncompressed. The method 400 may thinly provision the zone based on the maximum amount of space. In some examples, provisioning the zone further includes provisioning the zone approximately halfway within a largest available free space on the disk drive.

When the disk drive is an SMR drive, the method 400 may include allocating band isolation for the physical space of the SMR disk drive.

The method 400 may further include allocating a logical address space according to a maximum addressing size available for a given block size of the zone.

At block 415, the method 400 may further include storing compressed data in the zone in accordance with the provisioning. In some examples, storing compressed data on the physical space of the disk drive further includes selecting a compression level based on a read access time of the disk drive. Storing the compressed data may further include writing a data set to one or more zones of the physical space according to a compression level. Once the data is written, the method 400 may further report a space and indexing of the zone for read access.

The method 400 may further include decommissioning a compressed zone of physical space into a decommissioned zone and returning the decommissioned zone to a free pool. The method 400 may aggregate the decommissioned zone and one or more other decommissioned zones in the free pool. Provisioning the zone may include thinly provisioning the zone from the free pool. In some examples, the method 400 includes defragmenting the disk drive to move full physical zones such that smaller free extents can be aggregated into larger free extents.

The operations at block 405, 410, and/or 415 may be performed using the drive controller described with reference to FIGS. 1 and 2. Thus, the method 400 may provide for management of device storage. It should be noted that the method 400 is just one implementation and that the operations of the method 400 may be rearranged or otherwise modified such that other implementations are possible.

Figure 5:
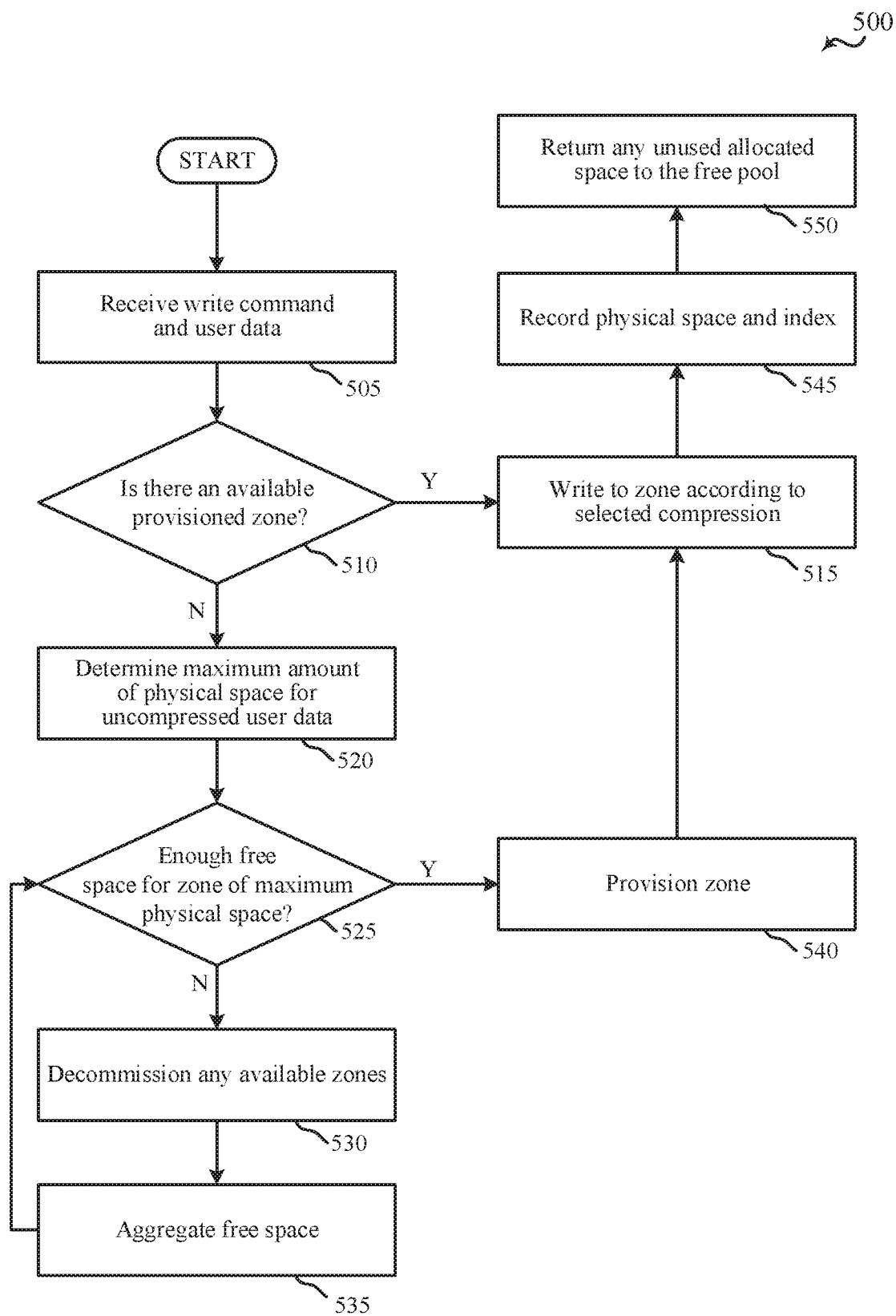
FIG. 5 is a flow chart illustrating another example of a method for data storage, in accordance with various aspects of the present disclosure.

FIG. 5 is a flow chart illustrating another example of a method 500 for data storage, in accordance with various aspects of the present disclosure. For clarity, the method 500 is described below with reference to aspects of one or more of the drive controllers 120 described with reference to FIGS. 1 and 2, and/or aspects of the system 100 described with reference to FIG. 1. In some examples, a drive controller may execute one or more sets of codes to control the functional elements of the storage device to perform the functions described below. Additionally or alternatively, the drive controller may perform one or more of the functions described below using special-purpose hardware.

The method 500 may begin at block 505 with receiving a write command to write user data to a storage device. The method 500 may also include receiving the user data to be written. The method 500 proceeds to determine if there are is an available provisioned zone at block 510. If there is an available provisioned zone, the method 500 proceeds to block 515, discussed below. However, if there is not an available provisioned zone, the method 500 may proceed to block 520 to create a newly provisioned zone.

At block 520, the method 500 includes determining a maximum amount of physical space the user data would need if the user data were not compressible. At block 525, the method 500 checks whether the free pool has enough free space for the zone if the maximum amount of physical space were required. If there is insufficient free space to allocate a zone, the method 500 proceeds to block 530 to decommission any zone that is available for decommissioning. Any decommissioned zones are added to the free pool. At block 535, the method 500 aggregates all free space (e.g., defragmenting, etc.). The method 500 returns to block 525 to check whether enough free space has been made available. If there is enough free space initially or enough free space has been aggregated, the method 500 proceeds to block 540. However, if there is still not a large enough extent, the method 500 may fail the write command.

In an example where there is a large enough extent for the new zone, the method 500 provisions the zone at block 540. The zone may be provisioned based on the uncompressed size. Once the zone is provisioned, the method 500 proceeds to block 515. At block 515, the method 500 writes the user data to the zone. The user data may be compressed on the storage device.

At block 545, the method 500 records the physical space that the user data required (whether compressed or not) and also records an index to address the zone. At block 550, the method 500 returns any unused allocated space to the free pool.

The operations at block 505, 510, 515, 520, 525, 530, 535, 540, 545, and/or 550 may be performed using the drive controller described with reference to FIGS. 1 and 2. Thus, the method 500 may provide for data storage. It should be noted that the method 500 is just one implementation and that the operations of the method 500 may be rearranged or otherwise modified such that other implementations are possible.

In some examples, aspects from two or more of the methods 400 and 500 may be combined. It should be noted that the methods 400 and 500 are just example implementations, and that the operations of the methods 400 and 500 may be rearranged or otherwise modified such that other implementations are possible.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

The foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, Electrically Erasable Programmable Read-Only Memory (EEPROM), flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for data storage comprising:
   receiving a command to write data to a disk drive;
   determining a maximum amount of space on the disk drive that would be used to write the data in an uncompressed state to the disk drive;
   selecting a compression level for the data;
   provisioning a zone of a physical space of the disk drive based at least in part on the determined maximum amount of space;
   compressing the data at the selected compression level; and
   storing the compressed data in the zone.

2. The method of claim 1, wherein the compression level is selected based at least in part on a read access time of the disk drive.

3. The method of claim 1, further comprising: specifying a logical zone granularity for logical space associated with the disk drive.

4. The method of claim 3, further comprising: provisioning the zone of the physical space of the disk drive based at least in part on the determined maximum amount of space and the specified logical zone granularity.

5. The method of claim 1, wherein the disk drive is a shingled magnetic recording (SMR) disk drive, the method further comprising:
   allocating band isolation for the physical space of the SMR disk drive.

6. The method of claim 1, further comprising:
   writing a data set to one or more zones of the physical space according to the compression level; and
   reporting a space and indexing of the zone for read access.

7. The method of claim 1, further comprising:
   decommissioning a compressed zone of physical space into a decommissioned zone; and
   returning the decommissioned zone to a free pool.

8. The method of claim 7, further comprising:
   aggregating the decommissioned zone and one or more other decommissioned zones in the free pool, wherein provisioning the zone further comprises thinly provisioning the zone from the free pool.

9. The method of claim 7, further comprising:
   defragmenting the disk drive to move full physical zones such that smaller free extents can be aggregated into larger free extents.

10. The method of claim 1, wherein provisioning the zone further comprises:
    provisioning the zone approximately halfway within a largest available free space on the disk drive.

11. The method of claim 1, further comprising:
    allocating a logical address space according to a maximum addressing size available for a given block size of the zone.

12. A data storage device, comprising:
    at least one storage device; and
    a drive controller to:
      receive a command to write data to a disk drive;
      determining a maximum amount of space on the disk drive that would be used to write the data in an uncompressed state to the disk drive;
      selecting a compression level for the data;
      provision a zone of a physical space of the disk drive based at least in part on the determined maximum amount of space;
      compress the data at the selected compression level; and
      store the compressed data in the zone.

13. The data storage device of claim 12, the drive controller further configured to:
    specify a logical zone granularity for logical space associated with a disk drive.

14. The data storage device of claim 13, the drive controller further configured to:

provision the zone of the physical space of the disk drive based at least in part on the determined maximum amount of space and the specified logical zone granularity.

15. The data storage device of claim 12, the drive controller further configured to:
allocate band isolation for the physical space of the SMR disk drive.

16. The data storage device of claim 12, the drive controller further configured to:
write a data set to one or more zones of the physical space according to the compression level; and
report a space and indexing of the zone for read access.

17. The data storage device of claim 12, the drive controller further configured to:
decommission a compressed zone of physical space into a decommissioned zone; and
return the decommissioned zone to a free pool.

18. The data storage device of claim 17, the drive controller further configured to:
aggregate the decommissioned zone and one or more other decommissioned zones in the free pool, wherein provisioning the zone further comprises thinly provisioning the zone from the free pool.

19. The data storage device of claim 17, the drive controller further configured to:
defragment the disk drive to move full physical zones such that smaller free extents can be aggregated into larger free extents.

20. A computer program product for a drive controller in a data storage system, the computer program product comprising a non-transitory computer-readable medium storing instructions executable by a processor to cause the drive controller to:
receive a command to write data to a disk drive;
determine a maximum amount of space on the disk drive that would be used to write the data in an uncompressed state to the disk drive;
select a compression level for the data;
provision a zone of a physical space of the disk drive based at least in part on the determined maximum amount of space;
compress the data at the selected compression level; and
store the compressed data in the zone.

* * * * *